United States Patent
Chauhan et al.

(10) Patent No.: US 11,909,579 B2
(45) Date of Patent: Feb. 20, 2024

(54) AUTONOMOUS AUDITING AND REMEDIATION OF IT ASSET RECORDS

(71) Applicant: ADOBE INC., San Jose, CA (US)

(72) Inventors: Lokendra Singh Chauhan, Bangalore (IN); Timothy Ira Scott Burton, Herriman, UT (US); Russell Marsh, Lindon, UT (US); Aditya Kumar, Jharkhand (IN); Sharad Jain, Uttar Pradesh (IN); Tonia Erin, Sandy, UT (US)

(73) Assignee: Adobe Inc., San Jose, CA (US)

( * ) Notice: Subject to any disclaimer, the term of this patent is extended or adjusted under 35 U.S.C. 154(b) by 2 days.

(21) Appl. No.: 17/533,630

(22) Filed: Nov. 23, 2021

(65) Prior Publication Data

US 2023/0164023 A1    May 25, 2023

(51) Int. Cl.
*H04L 41/0654* (2022.01)
*H04L 41/12* (2022.01)
(Continued)

(52) U.S. Cl.
CPC .... *H04L 41/0654* (2013.01); *G06F 18/24147* (2023.01); *H04L 41/12* (2013.01);
(Continued)

(58) Field of Classification Search
CPC ..... H04L 41/12; H04L 41/16; H04L 41/5003; H04L 41/5074; H04L 41/0873; H04L 41/085; H04L 41/0654; G06F 18/24147
See application file for complete search history.

(56) References Cited

U.S. PATENT DOCUMENTS

2006/0178954 A1* 8/2006 Thukral ................. G06Q 40/02
                                                          705/28
2010/0299168 A1* 11/2010 Alonzo ................. G06Q 40/06
                                                          705/7.29
(Continued)

OTHER PUBLICATIONS

"Algorithm", Wikipedia, Retrieved from Internet URL : https://en.wikipedia.org/wiki/ID3_algorithm, accessed on May 6, 2022, pp. 2.
(Continued)

*Primary Examiner* — Michael A Keller
*Assistant Examiner* — Zonghua Du
(74) *Attorney, Agent, or Firm* — Shook, Hardy & Bacon L.L.P.

(57) ABSTRACT

Embodiments relate to the autonomous remediation of IT asset records in accordance with rules-based asset management policies. An IT asset record associated with an IT asset and having a first piece of IT asset information is received and evaluated for compliance in accordance with defined asset management rules. The asset management rules require the IT asset record to include both the first piece and a second piece of IT asset information. In view of the rules, a determination is made that the IT asset record requires remediation. Based on a determination that the IT asset record requires remediation, a decision-tree machine learning model is utilized to infer, based on IT asset information available in the IT asset record, at least the second piece of IT asset information to place the IT asset record in compliance with the asset management rules.

15 Claims, 10 Drawing Sheets

(51) Int. Cl.
  *H04L 41/5074* (2022.01)
  *H04L 41/16* (2022.01)
  *H04L 41/5003* (2022.01)
  *G06F 18/2413* (2023.01)

(52) U.S. Cl.
  CPC .......... *H04L 41/16* (2013.01); *H04L 41/5003* (2013.01); *H04L 41/5074* (2013.01)

(56) References Cited

U.S. PATENT DOCUMENTS

| | | | | |
|---|---|---|---|---|
| 2014/0331326 | A1* | 11/2014 | Thakur | H04L 63/1433 726/25 |
| 2018/0189332 | A1* | 7/2018 | Asher | G06F 16/215 |
| 2019/0163720 | A1* | 5/2019 | Jha | G06Q 10/063 |
| 2020/0011784 | A1* | 1/2020 | Chalumuri | G06Q 10/20 |
| 2020/0204628 | A1* | 6/2020 | Desai | H04L 41/0668 |

OTHER PUBLICATIONS

"Decision_trees", scikit-learn, Retrieved from Internet URL : https://scikit-learn.org/stable/modules/generated/sklearn.tree.DecisionTreeClassifier.html, accessed on May 6, 2022, pp. 9.

"Decision_tree", Wikipedia, Retrieved from Internet URL : https://en.wikipedia.org/wiki/Decision_tree, accessed on May 6, 2022, pp. 11.

"LabelEncoder", Retrieved from Internet URL : https://scikit-learn.org/stable/modules/generated/sklearn.preprocessing.LabelEncoder.html, accessed on May 6, 2022, pp. 3.

"Tokenization" Retrieved from Internet URL : https://nlp.stanford.edu/IR-book/html/htmledition/tokenization-1.html, accessed on May 6, 2022, pp. 3.

"Weka 3: Machine Learning Software in Java" Retrieved from Internet URL : https://web.archive.org/web/20130106183852/https://www.cs.waikato.ac.nz/ml/weka/, accessed on May 6, 2022, pp. 1.

Ballou, D., P., and Pazer, H., L., "Modeling Data and Process Quality in Multi-Input, Multi-Output Information Systems", Management Science Department, vol. 31, No. 2, pp. 150-162 (Feb. 1985).

Dai, W., et al., "Improving Data Quality Through Deep Learning and Statistical Models", Advances in Intelligent Systems and Computing, pp. 1-8 (2018).

Galathiya, A., S., "Improved Decision Tree Induction Algorithm with Feature Selection, Cross Validation, Model Complexity and Reduced Error Pruning", International Journal of Computer Science and Information Technologies (IJCSIT), vol. 3, No. 2, pp. 3427-3431 (2012).

Kandel, S., et al., "Enterprise Data Analysis and Visualization: An Interview Study" IEEE Transactions on Visualization and Computer Graphics, vol. 18, No. 12, pp. 2917-2926 (Dec. 2012).

Lee, Y., W., et al., "AIMQ: a methodology for information quality assessment", Information and Management, vol. 40, pp. 133-146 (2002).

Patrick, S., et al., "The classification of information assets and risk assessment: An exploratory study using the case of C-Bank", Journal of Global Information Management, pp. 1-34 (Oct. 2015).

Pipino, L., L., et al., "Data Quality Assessment", Communications of the ACM, vol. 45, No. 4, pp. 211-218 (Apr. 2002).

Wang, R., Y., and Strong, D., M., "Beyond Accuracy: What Data Quality Means to Data Consumer", Journal of Management Information System, Spring, vol. 12, No. 4, pp. 5-34 (1996).

Woodall, P., et al., "Classifying Data Quality Problems in Asset Management"., Retrieved from Internet URL: https://www.researchgate.net/publication/259082028, DOI: 10.1007/978-3-319-09507-3_29, pp. 1-9 (2013).

Woodhouse, J., "Asset Management: concepts & practices", The Woodhouse Partnership Ltd, pp. 1-13 (2006).

\* cited by examiner

FIG. 7

AUTONOMOUS AUDITING AND REMEDIATION OF IT ASSET RECORDS

BACKGROUND

Within enterprise environments, the process of auditing and tracking information technology (IT) assets for compliance in view of asset management policies is necessary to ensure that threats, vulnerabilities, or risks to business operations are mitigated. The process of auditing, detecting, and reporting non-compliant IT assets can take months to attain compliance, and the conventionally manual process also introduces a wide variety of errors. In typical scenarios, administrators must discover and learn about assets on the network, determine whether the assets are in compliance of relevant asset management policies, and remediate any noncompliant assets, if deemed necessary.

SUMMARY

Embodiments of the present disclosure are directed to tracking and auditing information technology (IT) assets (e.g., computing devices) in a networked computing environment for compliance in accordance with asset management policies. A set of programmed rules that corresponds to defined asset management policies is employed to determine whether an IT asset record associated with a particular IT asset in the networked computing environment is in compliance with the defined asset management policies. In some instances, the IT asset record can be determined non-compliant in view of the rules because one or more pieces of device location information or device service information is incorrect or missing. To this end, the present disclosure relates to both the training and employment of machine learning models to infer or otherwise determine missing pieces of device location information or device service information associated with a particular IT asset record.

A machine learning model can be trained and employed to determine device location information or device service information associated with the IT asset. In order to train the machine learning model, a master dataset of IT asset information is generated based on IT asset records collected from discrete data sources within the networked computing environment, each data source storing information relating to a corresponding number of IT assets logged by (e.g., in communication with or detected by) the data source. In order to facilitate machine learning model training, certain asset attributes (i.e., features) of the IT asset records are selected based on an analysis of the records that reveals respective value distributions and inter-dependencies, among other things. Moreover, to optimize the master dataset for training, some of the selected asset attributes, such as those associated with categorical values, can be label encoded such that categories in each asset attribute are assigned a unique numerical value. The master dataset and the selected asset attributes, including the label encoded asset attributes, are employed to train a decision tree-based machine learning model that, when given an IT asset record associated with an IT asset, is employable to infer or otherwise determine one or more pieces of device location information or device service information associated with the IT asset. Based on the determination of one or more pieces of device location information or device service information associated with the determined non-compliant IT asset, the IT asset record associated with the non-compliant IT asset can be manually or autonomously updated to place the IT asset and its record into compliance.

Advantageously, IT asset records associated with non-compliant IT assets in a networked computing environment can be detected, collected, and ultimately remediated, or in other words updated, in near real time or on-demand to comply with defined asset management policies. Unlike conventional methods that require the manual cataloguing, reconciling, normalizing, and auditing of IT asset records, the disclosed embodiments can detect IT assets in a networked computing environment, audit IT records associated with the IT assets, determine whether IT assets are compliant in accordance with defined asset management policies, generate inferences to remediate non-compliant IT asset records, and resolve such issues with minimal or no human intervention. A machine learning model that determines these inferences is trained with analytically-selected features, thereby ensuring a high level of accuracy in the automatic remediation of determined non-compliant IT asset records.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 7 is an illustration of another user interface of an AAIS in accordance with some embodiments of the present invention;

DETAILED DESCRIPTION

Figure 1:
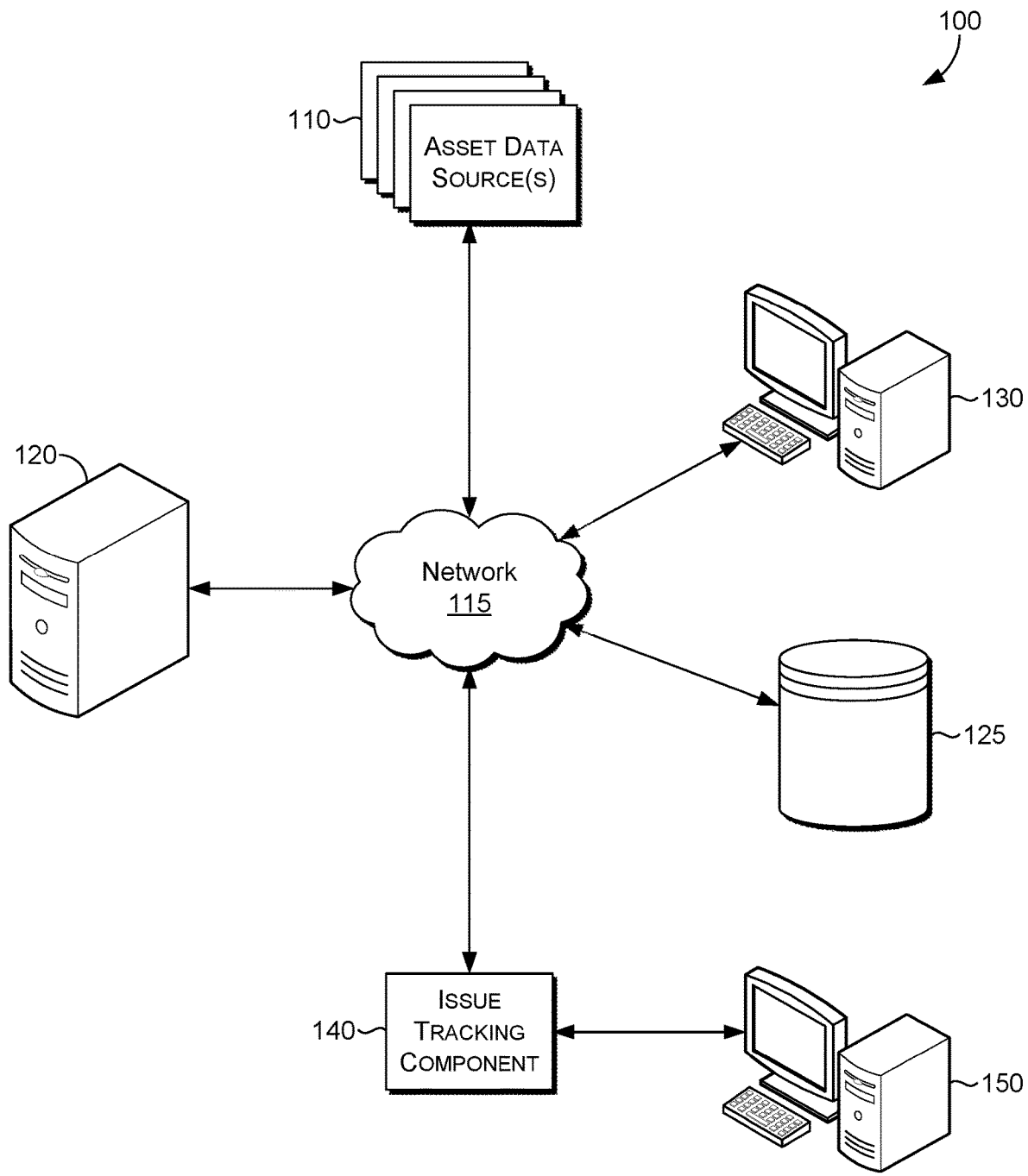
FIG. 1 is an exemplary system for auditing and remediating information technology (IT) asset records in accordance with some embodiments of the present invention.

The auditing, tracking, and remediation of non-compliant information technology (IT) assets in a networked computing environment is generally a very manual and tedious process, one that is prone to error and inconsistencies. In large enterprise environments, data sources associated with a variety of network services are typically available, each of which can provide complete or incomplete records of IT assets. While these data sources provide a general snapshot of IT assets within the enterprise, the data is generally inaccurate or incomplete, having no regard to compliance, which can have negative consequences on business operations or on service restoration times in production environments.

While conventional systems do exist to facilitate auditing and tracking of non-compliant IT assets, such systems generally are not fully compliant with asset management policies. It can still take months to audit, detect, and report non-compliant IT assets utilizing such systems. In typical settings, an asset owner may not know the non-compliance category or have a recommendation to remediate the non-compliance issue and as such, the rate of establishing overall compliance could take an unreasonable amount of time. Moreover, larger entities may include a variety of teams that are separately responsible for tracking and maintaining IT assets. When reconciling IT asset information from numerous parties, inconsistencies or incomplete asset information can cause further delay.

Accordingly, embodiments of the present disclosure are directed to automatically auditing, tracking and remediating IT asset records associated with IT assets in a networked computing environment. In some embodiments, a plurality of IT asset records is collected from a diverse set of data sources. Each data source can provide various pieces of information related to one or more IT assets associated with the data source. In various embodiments, the information includes different types of IT asset-related information (e.g., attributes or features) with corresponding values, such as IP address, MAC address, hostname, and the like. This collected information can be normalized and cleaned to generate a master dataset, which includes records for a plurality of IT assets. In some instances, values for certain IT asset attributes, such as those that are non-numerical, are tokenized. Moreover, in some instances, these tokenized values or other categorical values are assigned unique numerical values, or in other words label encoded, to facilitate the ability to derive insights therefrom.

In some embodiments, the master dataset is analyzed to identify asset attributes or features that are useful to build either of two machine learning models, one for inferring device location information and/or one for inferring device service (or owner) information of a given IT asset (i.e., computing device) based on its IT asset record. The values for each asset attribute in the master dataset can be analyzed to determine whether the values are equally distributed or are biased. In some embodiments, if a certain asset attribute is highly-biased, it is ignored to avoid measurement errors during model training. In some further embodiments, correlations between asset attributes are analyzed to determine the existence of potential dependencies there between. When training a model employable to infer device location information (i.e., a device location inference model)), the selected asset attributes can include, by way of example, IP address or asset location. Alternatively, when training a model employable to infer device service information (i.e., a device service inference model), the selected asset attributes can include, by way of example, device ID, hostname, device name, IP address, or device service ID.

Depending on the model being trained, the corresponding selected plurality of asset attributes can be employed to train a decision tree-based machine learning model employable to generate inferences relating to the device location or device service associated with a particular IT asset, as described herein. To this end, in some embodiments, recommendations to update the master dataset based on identified conflicts, errors, or missing values, are generated and presented to a user so that the user can manually direct the system to update the master dataset utilizing the generated inference(s). In some other embodiments, the master dataset is autonomously updated based on the inference(s) generated from any one of the decision tree-based machine learning models. In some further embodiments, an issue ticket associated with a recommendation (e.g., a generated inference for an IT asset record) is autonomously created and then closed (i.e., flagged as addressed or completed), autonomously or manually, based on an update made in accordance with the generated recommendation.

The system described herein automates the IT asset data collection and compliance audits for IT assets in a networked computing environment. The ability to automate these processes ensures accuracy in IT asset data collection and auditing of IT assets with minimal to no human intervention, also vastly improving overall efficiencies. Moreover, the described system not only identifies non-compliant IT assets, but generates inferences for missing or incorrect pieces of the IT asset data with a high rate of accuracy. The utilization of data analytics and natural language processing techniques in feature selection ensures that a machine model is trained to generate such inferences both accurately and efficiently. To this end, the ability to autonomously identify and remediate non-compliant IT asset records can save significant human and computing resources.

Turning now to FIG. 1, illustrated is a high level schematic depiction of an exemplary system 100 in which some embodiments of the present disclosure may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system in FIG. 1 includes a plurality of information technology (IT) asset data sources 110 that are each coupled to and in communication with a network 115 (e.g., the Internet, intranet, corporate network). Each asset data source of the asset data sources 110 can include any variety of computing devices or databases that store IT asset records (i.e., information about IT assets). In some aspects, an asset data source tracks, detects, discovers, or observes IT assets on the network 115 and generates associated IT asset records (i.e., logs) for storage thereby. An IT asset record can include asset attributes (i.e., features) associated with an IT asset, such as IP address, unique identifier, subnet, device name, hostname, MAC address, domain name, device service name, device service identifier, and the like. An asset data source can include any combination of machine, host, service, or peripheral, among other things, that stores or logs IT asset records thereon. By way of non-limiting example, an asset data source can include systems and services such as service knowledge management systems (SKMS), domain name systems (DNS), virtualization solutions (e.g., VMware), network observation tools (e.g., Hubble), address resolution protocols (ARP), and the like.

The system 100 also has an asset accuracy intelligence system (AAIS) 120 that includes one or more computing devices, such as the computing device later described in accordance with FIG. 9. In accordance with some embodiments, the AAIS 120 audits IT assets based on associated IT asset records and a defined asset management policy, flags certain IT assets (or their associated records) as non-compliant in view of the defined asset management policy, and in doing so reduces the overall audit duration. Moreover, the AAIS 120 can utilize machine learning models to determine non-compliance, recommend appropriate remediation action to a user, or even autonomously perform remediation to the non-compliant assets.

Like the asset data sources 110, the AAIS 120 can also be connected to and in communication with network 115, and can communicate with the asset data sources 110 by retrieving and/or receiving IT asset records therefrom. The AAIS 120 can receive IT asset records and generate a master dataset utilizing the IT asset records for storage into the database 125. For purposes of properly training the machine learning models, the AAIS 120 can clean the master dataset utilizing a variety of normalization and filtering techniques, as will be described.

The AAIS 120 can facilitate the selection of features that are useful for model training, as well. In some embodiments, the AAIS 120 modifies one or more portions of the IT asset records in the master dataset, to facilitate the extraction of insights therefrom to facilitate feature selection. For instance, the AAIS 120 can tokenize some values of one or more features, such as categorical features, to facilitate insight derivation. In some further embodiments, the AAIS 120 analyzes the values of each feature, before or after tokenization, to facilitate the determination of a feature's utility in training the machine learning model. For example, the AAIS 120 can analyze the distribution of various feature values to determine whether the feature's data is equally distributed or biased, such that highly-biased features are ignored to avoid measurement errors during training. In another example, the AAIS 120 can determine correlational strength between various selected features to determine how much one feature might be dependent on another feature. In some embodiments, the AAIS 120 modifies one or more portions of the IT asset records in the master dataset, to facilitate model training. For instance, the AAIS 120 can label encode some of the values in the master dataset to optimize efficiency and accuracy in model training, as will be described in further detail herein.

The AAIS 120 can generate either or both of two machine learning models (i.e., a device location inference model, a device service inference model), each of which target the same classification problem for different asset features, specifically device location information and device service information. In accordance with some embodiments, the device location information includes IT asset information relating to the physical geographical location of where the device or IT asset is located. IT asset features relating to device location information can include IP address, device location name, or data center name, among other things. The device service, on the other hand, can include IT asset information relating to the primary purpose or usage of the device or IT asset. IT asset features relating to device service information can include a unique device identifier ("device ID"), a host name, a device name, IP address, or a device service identifier ("device service ID"), among other things. One of the goals for the machine learning model is to infer or otherwise determine the correct value of these features, particularly for the IT assets where the values are missing in the associated IT asset record. To this end, in some embodiments, the AAIS 120 utilizes decision tree-based machine learning to accomplish the foregoing tasks.

Having trained the machine learning model (e.g., a device location inference model, a device service inference model), the AAIS 120 can provide a variety of techniques for remediating non-compliant IT asset records. In some embodiments, the AAIS 120 receives an IT asset record of an IT asset and processes the IT asset record through a device location inference model. In other words, the AAIS 120 can determine that one or more pieces of device location information is missing, and process the IT asset record through the device location inference model. The AAIS 120 can process the IT asset record through the device location inference model to determine, or in other words make an inference of, one or more pieces of device location information. The inferred data can include device location information that is missing from the IT asset record. It is also contemplated that the inferred data can included pieces of device location information that conflicts with device location information that is already present in the IT asset record. In some other embodiments, the AAIS 120 receives an IT asset record of an IT asset and processes the IT asset record through a device service inference model. In other words, the AAIS 120 can determine that one or more pieces of device service information is missing, and process the IT asset record through the device service inference model. The AAIS 120 can process the IT asset record through the device service inference model to determine, or in other words make an inference of, one or more pieces of device service information. Similar to the device location inference model, the inference data from the device service inference model can include device service information that is missing from the IT asset record. It is also contemplated that the inferred data can include pieces of device service information that conflicts with device service information that is already present in the IT asset record.

In some embodiments, the AAIS 120 determines that one or more pieces of IT asset information (e.g., device location information or device service information), in an IT asset record, is missing or conflicting with inferred data, and thus responsively generates a notification that can be provided for display to a computing device 130 (e.g., a client device or a user device) coupled to the network 115. Among other things, the AAIS 120 can provide an IT asset records management system that enables a user of the client device 130 to view the master dataset, remediate issues (e.g., flagged non-compliant assets) with the master dataset, and view other analytics information relating to the master dataset. For instance, the AAIS 120 can generate a web interface that is accessible by the client device 130, so that a user of the client device 130 can be informed of identified issues (e.g., missing or conflicting IT asset information) and actively provide the AAIS 120 instructions to remediate the issues. The AAIS 120, in some embodiments, receives instructions from the client device 130 to update the IT asset record with the inferred IT asset information, so that the updated IT asset record is stored in the master dataset. In some other embodiments, the AAIS 120 autonomously updates and stores the updated IT asset record with the inferred information, without any user interaction.

Lastly, the AAIS 120 can include or be coupled to an issue tracking component 140 via the network 115. In some embodiments, the issue tracking component 140 includes an issue tracking or service management system, or more specifically a ticketing system, that provides users with the ability to view issues (e.g., non-compliant assets) identified by the AAIS 120. In some instances, the issue tracking component 140 autonomously generates an issue ticket in response to the AAIS 120 determining that one or more pieces of IT asset information (e.g., device location information or device service information) is missing from an IT asset record, or that one or more pieces of such information already in an IT asset record conflicts with IT asset information inferred by the AAIS 120. In this regard, the issue tracking component 140 can automatically generate an issue ticket and present to another computing device 150 (e.g., another client device or another user device), via a web interface, the generated issue ticket. The issue tracking component 140 can include controls in the web interface, that enables a user of the client device 150 to approve or deny a suggested or recommended update to the IT asset record. As described herein, the suggested or recommended update can included one or more pieces of IT asset information (e.g., device location information or device service information) inferred by the AAIS 120. As such, the issue tracking component 140 can receive an approval via the web interface to update the IT asset record, and request the AAIS 120 to apply the update to the IT asset record for storage in the database 125. In some other embodiments, the issue tracking component autonomously generates an issue ticket, automatically requests that the AAIS 120 apply the recommended update based on inferences produced thereby, and automatically closes the issue ticket so that a record of the applied update is stored in the ticketing system's records.

Figure 2:
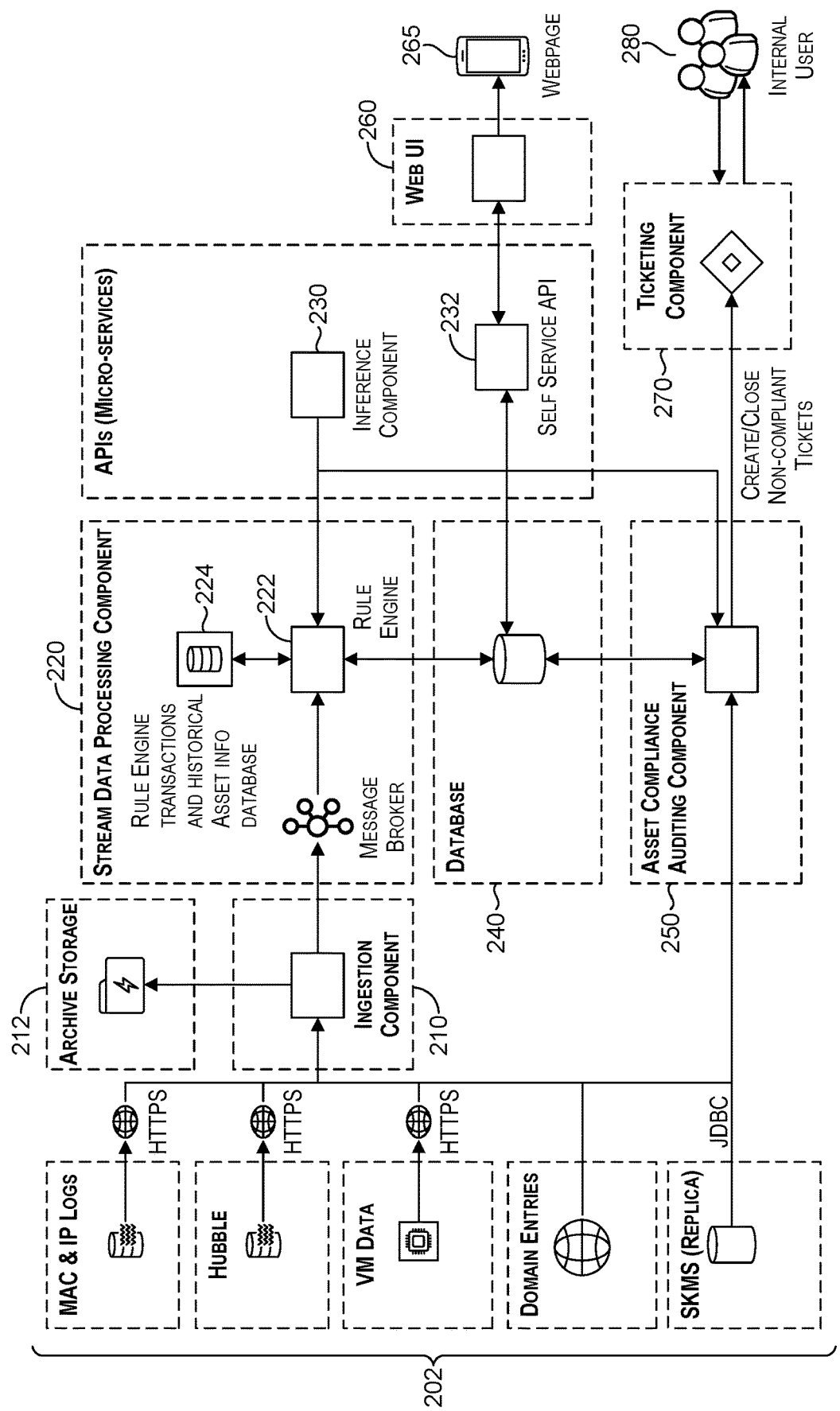
FIG. 2 is a block diagram of an asset accuracy intelligence system (AAIS) in accordance with some embodiments of the present invention.

Referring now to FIG. 2, FIG. 2 illustrates a more detailed schematic depiction of an exemplary asset accuracy intelligence system (AAIS) 200 (such as the AAIS 120 of FIG. 1) in which some embodiments of the present disclosure may be employed. As described in FIG. 1, it should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The AAIS 200 of FIG. 2 can include, at a high level, an ingestion component 210 that retrieves, extracts, receives, or otherwise obtains IT asset information from a variety of asset data sources 202, such as the non-limiting example data sources (e.g., MAC & IP Logs, Hubble, VM Data, Domain Entries, SKMS) depicted in FIG. 2 and/or those discussed in accordance with asset data sources 110 of FIG. 1. The ingestion component 210 can, among other things, implement integrations with the asset data sources 202 or associated systems to fetch network infrastructure logs, or scan network configurations to discover and retrieve accurate asset information. The ingestion component 210 can also archive the discovered asset information into a data store, such as archive storage 212.

In some embodiments, the AAIS 200 includes a stream data processing component 220 that can receive the discovered asset information (e.g., from ingestion component 210), extract the relevant asset information, and generate IT asset records in near real-time. The stream data processing component 220 can include a rule engine 222 in which an asset management policy is defined, or in other words, where corresponding rules for flagging an IT asset record for compliance or non-compliance in view of the asset management policy are defined. When an asset record is generated based on the received asset information, the asset record can be analyzed, or in other words audited, by the rule engine 222 for compliance or non-compliance in accordance with the defined asset management policy (i.e., a set of asset management rules). In some embodiments, the rule engine flags an IT asset record as compliant or non-compliant in view of the defined asset management policy, and stores the record and its compliance status (e.g., a flag or a corresponding feature value) in database 240.

The AAIS 200 can also include an inference component 230 that can train any number of machine learning models (e.g., a device location inference model, a device service inference model) and employ the trained machine learning models to facilitate the inference of IT asset information, such as device location information (e.g., IP address, device location name, data center name) or device service information (e.g., device identifier, hostname, IP address, device service identifier) for a given IT asset record. In some embodiments, the inference component 230 is made accessible via one or more APIs. By way of example, if one or more pieces of device location information or device service information is missing for the asset record, then the rule engine can utilize the inference component 230 (e.g., send the IT asset record or at least a portion of the IT asset record to inference component 230) to determine whether the missing information can be inferred by the corresponding trained machine learning model (e.g., device location inference model for missing device location information, device service inference model for missing device service information). In some embodiments, the inference component 230 generates an inference of the missing IT asset information and sends it back to the rule engine 222 for subsequent storage as recommendation data in database 240. It is also contemplated that in some other embodiments, all of the IT asset information is present in the asset record, and the rule engine utilizes inference component 230 to determine whether inferences can be made about the existing device location information or device service information within the IT asset record. In some instances, the inference component 230 generates an inference on one or more pieces of the IT asset information, and sends it back to the rule engine 222 for comparison with the existing IT asset information. To this end, the rule engine 222 can store, in database 240, the audited asset data as well as recommendation data (e.g., any determined conflicting inference data).

In some embodiments, the AAIS 200 implements a self-service API 232 that provides access to asset records stored in database 240, and is made accessible via a web user interface 260 from a user device 265. To this end, the user device 265 can display, via the web user interface 260, information relating to assets that are flagged compliant and/or non-compliant by the rule engine. In some further embodiments, the user device 265 sends instructions, to the AAIS 200, to accept or deny recommendation data (i.e., generated inferences) associated with an IT asset record. The AAIS 200 can thus provide direct access to determined non-compliant IT asset records, so that an administrator or other user can update IT asset records with recommendation data (i.e., inferred IT asset information) generated by the inference component 230.

In some further embodiments, AAIS 200 of FIG. 2 further includes an asset compliance auditing component 250 that monitors the database 240 for IT asset records having been flagged (e.g., by rule engine 222) as non-compliant. In this regard, the asset compliance auditing component 250 can continuously or periodically monitor the database 240 to determine whether an IT asset record needs remediation (i.e., flagged for non-compliance) or has been remediated, among other things. In some aspects, the asset compliance auditing component 250 can be in communication with a ticketing component 270, similar to the issue tracking component 140 of FIG. 1, that can automatically generate an issue ticket based on a determination that an IT asset record associated with a non-compliance flag is stored in database 240. As discussed in accordance with FIG. 1, the ticketing component 270 can present a user interface that is accessible by a user 280 via an associated computing device, so that the user 280 can be made aware of the generated ticket. The ticketing component 270 can receive instructions, from the user 280, to accept recommendation data associated with a non-compliant IT asset record, and the asset compliance auditing component 250 can update the IT asset record with the recommendation data (i.e., the missing or conflicting inferred data) for storage in the database 240. It is contemplated that the IT asset record can be flagged as compliant once the recommendation data is applied to the IT asset record and stored, and the ticketing component 270 can automatically close the issue ticket associated with the IT asset record in response to the application and subsequent storage of the recommendation data in association with the IT asset record.

Figure 3:
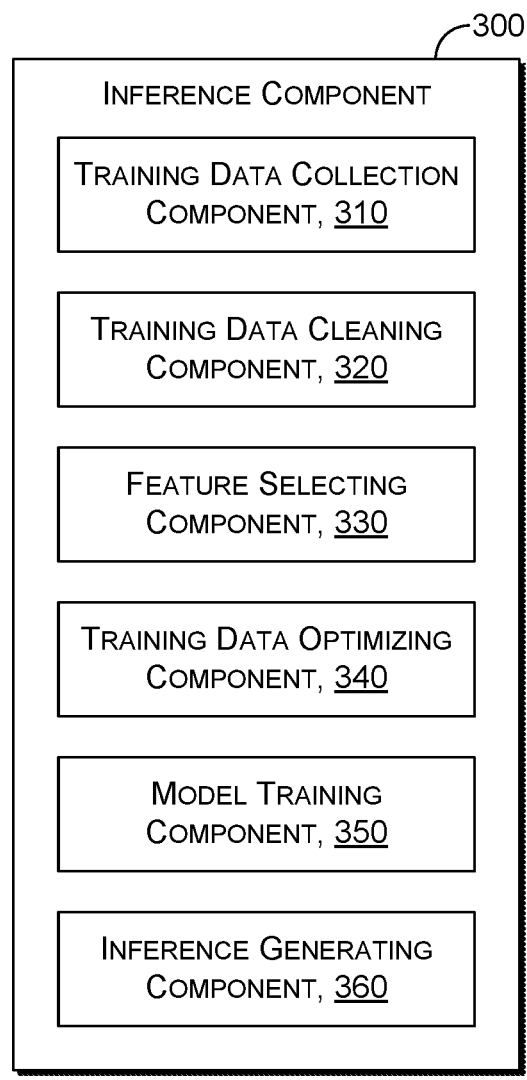
FIG. 3 is a block diagram of an inference component in accordance with some embodiments of the present invention.

Looking now to FIG. 3, a block diagram illustrates components of an inference component as was briefly described in accordance with inference component 230 in AAIS 200 of FIG. 2. In some embodiments, the inference component 300 is employed to train a decision-tree based machine learning model that generates inferences about any particular IT asset based on its associated IT asset record. In some embodiments, the inference component 300 can train a device location inference model for generating inferences about device location information regarding the IT asset. In some other embodiments, the inference component 300 can train a device service inference model for generating inferences about device service information regarding the IT asset. In addition to training the decision tree models, however, the inference component 300 can also be employed to generate the training data, clean and/or normalize the training data, identify useful features for the training data, and/or optimize the training data prior to model training. To this end, the inference component 300 can include a training data collection component 310, a training data cleaning component 320, a feature selecting component 330, a training data optimizing component 340, a model training component 350, and an inference generating component 360, as will be described herein.

In some embodiments, the inference component 300 includes a training data collection component 310 that receives a plurality of IT asset records from a variety of asset data sources, such as asset data sources 110 of FIG. 1. The IT asset records can be retrieved or obtained directly from the asset data sources, though it is contemplated that IT asset records can be received by the inference component 300 from any combination of components described in FIG. 2, such as the stream data processing component 220, database 224, ingestion component 210, or archive storage 212. In various embodiments, an IT asset record in the plurality of IT asset records includes a variety of information relating to a corresponding IT asset, such as IP address, MAC address, hostname, device name, service name, or any other asset attribute or feature described in the present disclosure. The training data collection component 310 can generate a master dataset based on the obtained plurality of IT asset records.

The inference component 300 can also include a training data cleaning component 320 that cleans the master dataset prior to the model training process. As missing values or outliers can appear in the master dataset, the training data cleaning component 320 can remove these records to prevent issues in model training. In some embodiments, the cleaning process includes any combination of steps, such as (1) dropping (or in other words deleting) data records that do not have attributes that could uniquely identify an asset; (2) dropping data records that don't have a date; (3) dropping data records whereby more than 50% of the asset attributes (i.e., columns) are empty; (4) for string-type features, replacing null values or otherwise empty values with an "UNKNOWN" string; and (5) for numerical-type features, replacing null values or otherwise empty values with an average value of the feature.

Figure 4:
FIG. 4 is an illustration of various histograms and distribution charts for values associated with features extracted from a master dataset in accordance with some embodiments of the present invention.

In some further embodiments, the inference component 300 includes a feature selecting component 330 that ensures that asset attributes or "features" that are selected for training are useful to build the model(s). It is contemplated that the addition of redundant variables can reduce model quality, and the selection of excess features can result in undesirable complexity of the model. To this end, in some embodiments, the feature selecting component 330 analyzes the distribution of feature values to determine whether the feature data is equally distributed or is biased to any particular value. The feature selecting component 330 can identify a feature having high bias to a particular value, and thus ignore (i.e., not select) the feature for purposes of training, to avoid training measurement errors. FIG. 4 depicts example histograms or distribution charts for values associated with a variety of features extracted from a master dataset. Utilizing these histograms, the feature selecting component 330 can analyze how the values are distributed for a particular feature, and then make a decision about whether the feature should be selected for training. More specifically, looking at a first chart 410 labeled DEVICE_MODEL_ID, the feature selecting component 330 can determine that the first chart 410 presents multiple bars representative of different values, and that the data generally includes a well-distributed array of values for the DEVICE_MODEL_ID feature. To this end, the feature selecting component 330 can select the DEVICE_MODEL_ID feature as one to include in the model training process because a determination was made that the values associated with the feature are distributed above a diversity threshold. In some embodiments, a feature is determined distributed if the feature is associated with a variation of values having at least a threshold diversity. That is, a feature can be determined distributed (i.e., above a diversity threshold) if the feature has more than a threshold number or percentage of different values (e.g., X number of different values, Y % of variability). Referencing now another example, looking at a second chart 420 labeled DEVICE_ENV_ID, the feature selecting component 330 can determine that the second chart 420 presents only one bar that corresponds to a particular value, and that the data is highly biased to the particular value. To this end, the feature selecting component 330 would not select the DEVICE_MODEL_ID feature as one to include in the model training process. In some embodiments, a feature is determined not distributed, or in other words biased to a particular value, if the feature is associated with one or more values not having a threshold diversity. That is, a feature can be determined not distributed if less than a threshold number of values for the feature is different or that the feature has less than a threshold percentage of different values.

Figure 5:
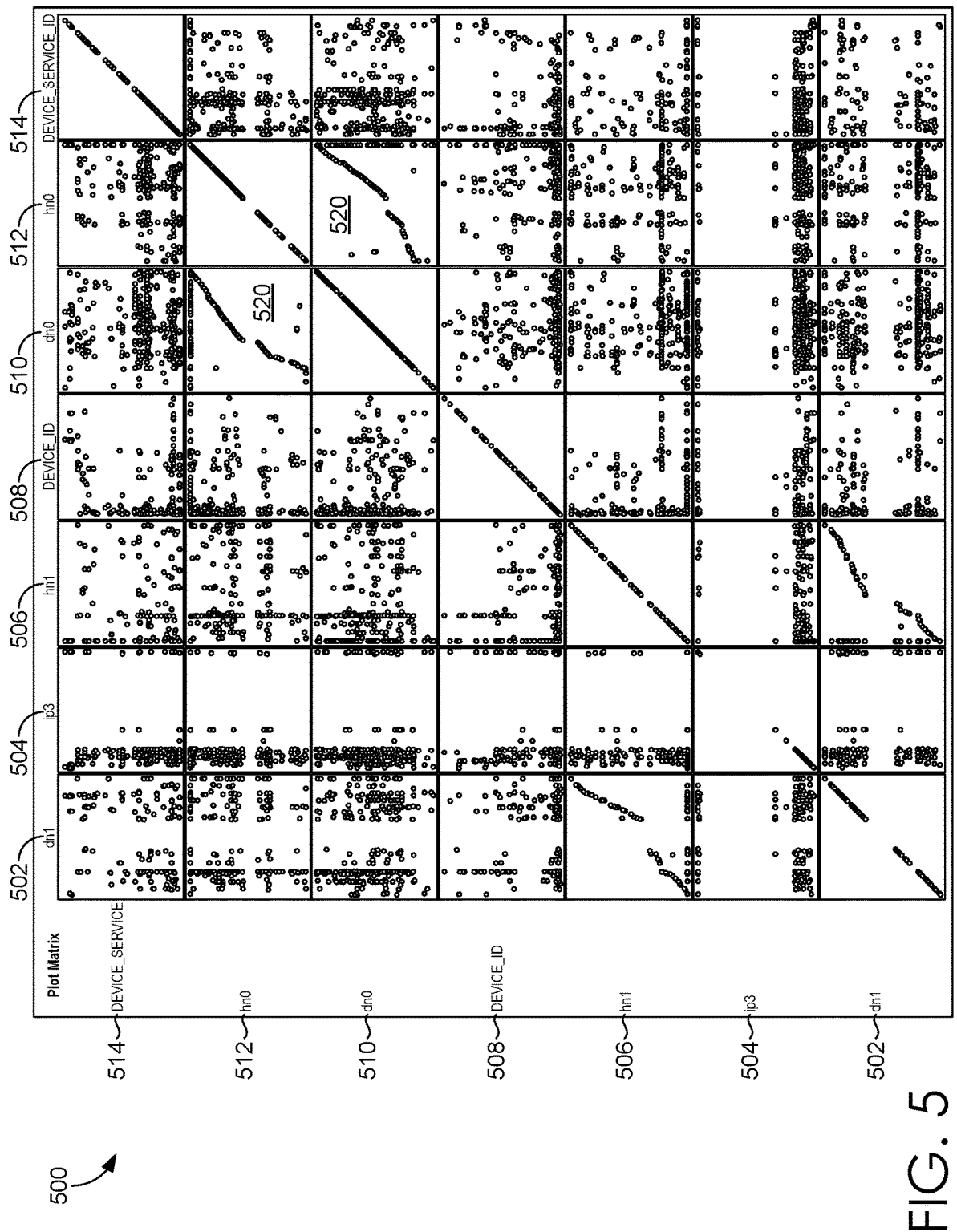
FIG. 5 is an illustration of various plot matrices generated based on values associated with feature pairs extracted from a master dataset in accordance with some embodiments of the present invention.

The feature selecting component 330 can analyze correlations between various feature values to determine whether any one feature is dependent on another feature. FIG. 5 depicts example plot matrices 500 generated based on values associated with pairs of features extracted from a master dataset. Utilizing these plot matrices 500, the feature selecting component 330 can analyze how values between two particular features are correlated with one another, and then make a decision about whether the feature should be selected for training. More specifically, looking at a first plot matrix 520 identified at the intersection of features hn0 512 and dn0 510, the feature selecting component 330 can determine that the first plot matrix 520 presents a strong linear relationship between the two features, and that the data indicates that there is a threshold positive correlation between the values of hn0 512 and dn0 510. To this end, the feature selecting component 330 can select hn0 512 and dn0 510 as features to include in the model training process because a determination was made that the values associated with the features are related to one another having a threshold positive correlation. In some embodiments, a feature is determined correlated to another feature if the linear relationship between the two features is determined to have a correlation coefficient that is above a positive threshold value (e.g., +0.2, +0.5, +0.7) or below a negative threshold value (e.g., −0.2, −0.5, −0.7).

In some further embodiments, the inference component 300 includes a training data optimizing component 340 that modifies values for one or more features of the master dataset prior to model training. IT asset information can include a variety of numerical and non-numerical values, although the majority of IT asset information is categorical, or in other words non-numerical. For instance, IP addresses (e.g., 192.168.1.1), subnets (e.g., 255.255.0.0), domain names (e.g., adobe.com), and the like, are features that include categorical values. It is generally understood that the majority of machine learning models prefer numerical values over categorical values as input during the training phase. It is also understood that numerical values tend to generate optimal results in model training when compared to categorical values. To this end, the training data optimizing component 340 can employ label encoding, such that for any particular feature, the training data optimizing component 340 can determine a total number of categories (n classes) and assign a unique numerical value (between 0 and n−1) to each of the determined categories.

In some further embodiments, the training data optimizing component 340 tokenizes values of certain categorical features to facilitate the derivation of insights, like those performed by feature selecting component 330. In some aspects, values can be tokenized into portions (e.g., words) defined by common separators, such as spaces in a sentence. Alternatively, values can be tokenized into portions (e.g., numbers) defined by periods, decimals, or other symbols, such as decimal separators in an IP address. By way of non-limiting example, an IP address of an asset record comprises a categorical value, such as 192.168.001.001. The training data optimizing component 340 can, by way of example, tokenize the IP address so that the value is broken down into useful semantic units (e.g., 192, 168, 001, 001). With reference to FIG. 5, the ip3 504 feature represents the first octet of IP addresses in the master dataset. The first token (ip3 504) of the IP address can be useful, independent of the remainder of the IP address, to determine whether correlations exist between the first token and other tokens or other features in the master dataset.

The following is a list of some exemplary attributes portrayed in FIG. 5 and is provided solely for purposes of understanding how feature selecting component 330 can derive insights from the various features of the master dataset, and how training data optimizing component 340 can modify the master dataset for purposes of insight derivation. In FIG. 5, the feature dn1 502 represents a non-numerical identifier of a Device Name (i.e., a name associated with an IT asset), and can be utilized to identify a mapping to a particular party or team that owns the IT asset. The feature ip3 504 represents the first octet of an IP address associated with an IT asset. Though only the first octet, any other tokenized portion (e.g., other octets) of the IP address can be identified as a separate feature and analyzed. The feature hn1 506 can represent a non-numerical identifier of a hostname (e.g., a categorical hostname), and can be utilized to identify mappings to a party or team that owns the particular IT asset. The feature dn0 510 can represent a numerical identifier of a Device Name (i.e., the name associated with the IT asset), and can be utilized to identify a group of devices created by a particular party or team. The feature hn0 512 can represent a numerical identifier of a hostname, and can be utilized to identify a group of devices created by a particular party or team.

The inference component 300 can include a model training component 350 that can train a decision-tree based machine learning model. As described, in some embodiments, the machine learning model is employable to determine or otherwise infer a device location associated with an IT asset. As described herein, a device location of an IT asset can include one or more location-relevant features relating to the IT asset, such as IP address, device location name, or data center name, among other things. In some other embodiments, the machine learning model is employable to determine or otherwise infer a device service associated with the IT asset. The device service of an IT asset, on the other hand, can include one or more service-relevant features relating to a primary purpose or usage of the IT asset, such as a unique device identifier, a host name, a device name, IP address, or a device service identifier, among other things. In various embodiments, the goal for the machine learning model is to determine or infer a value for one or more of these aforementioned features, particularly for an IT asset where IT asset information (e.g., a value for a device location or device service-type feature) is missing in an associated IT asset record.

In accordance with some embodiments described herein, the model training component 350 employs decision-tree methodologies to train or otherwise generate the machine learning model. The model training component 350 can request from and/or receive, from feature selecting component 330, a selected set of features for the machine learning model employable to determine or otherwise infer IT asset information (e.g., a value for a device location or device service-type feature) for an IT asset. The model training component 350 can also request from and/or receive, from training data optimizing component 340, that at least a portion of the IT asset records in the master dataset is tokenized and/or label encoded for purposes of training the machine learning model. In some aspects, the portion of IT asset records can be a random selection of IT records from the master dataset. To this end, the model training component 350 can utilize a larger percentage (e.g., 70%) of the portion of IT asset records to train the machine learning model, preferably utilizing a decision-tree model. In some embodiments, a remaining, smaller percentage (e.g., 30%) of the portion of IT asset records is temporarily stored to test the first machine learning model after training.

In various embodiments, the inference component 300 includes an inference generating component 360 that employs a trained machine learning model to generate, based on information currently stored in an IT asset record associated with an IT asset, an inference about one or more pieces of IT asset information (e.g., device location information or device service information) associated with the IT asset. In some embodiments, the inference generating component 360 receives as input an IT asset record that is missing a piece of device location information relating to the IT asset and determines that the piece of device location is missing. In some embodiments, if the inference generating component 360 determines that the missing information is device location information, the inference generating component 360 can employ the device location inference model to generate, as a result based on the IT asset record provided thereto, one or more pieces of device location information that corresponds to the missing device location information. As is also described herein, the inference generating component 360 can receive as input an IT asset record that is includes a complete set of device location information relating to the IT asset. The inference generating component 360 can employ the device location inference model to generate, as a result based on the IT asset record provided thereto, one or more pieces of device location information that corresponds to, but conflicts with, the device location information already in the IT asset record. In some aspects, the generated or otherwise inferred piece(s) of device location information can be communicated to a rule engine, such as rule engine 222 of FIG. 2, a database such as database 240 of FIG. 2, a ticketing component such as ticketing component 270 of FIG. 2, or otherwise provided for display to a user device such as user device 265 of FIG. 2. It is contemplated that an inferred piece of device location information can be stored as a recommendation to be acted upon in association with the IT asset record, so that a user (e.g., user 280 of FIG. 2) can act upon the recommendation and update the IT asset record with the stored device location information.

Similarly, in some other embodiments, the inference generating component 360 receives as input an IT asset record that is missing a piece of device service information relating to the IT asset and determines that the piece of device service information is missing. The inference generating component 360 can employ the device service inference model to generate, as a result based on the IT asset record provided thereto, one or more pieces of device service information that corresponds to the missing device service information. As described herein, in some other embodiments, the inference generating component 360 receives as input an IT asset record that includes a complete set of device service information relating to the IT asset. The inference generating component 360 can employ the trained device service inference model to generate, as a result based on the IT asset record provided thereto, one or more pieces of device service information that corresponds to, but conflicts with, the device service information in the IT asset record. In some aspects, the generated or otherwise inferred piece(s) of device service information can be communicated to a rule engine such as rule engine 222 of FIG. 2, a database such as database 240 of FIG. 2, a ticketing component such as ticketing component 270 of FIG. 2, or otherwise provided for display to a user device such as user device 265 of FIG. 2. It is contemplated that an inferred piece of device service information can be stored as a recommendation to be acted upon in association with the IT asset record, so that a user (e.g., user 280 of FIG. 2) can act upon the recommendation and update the IT asset record with the stored device service information.

Figure 6:
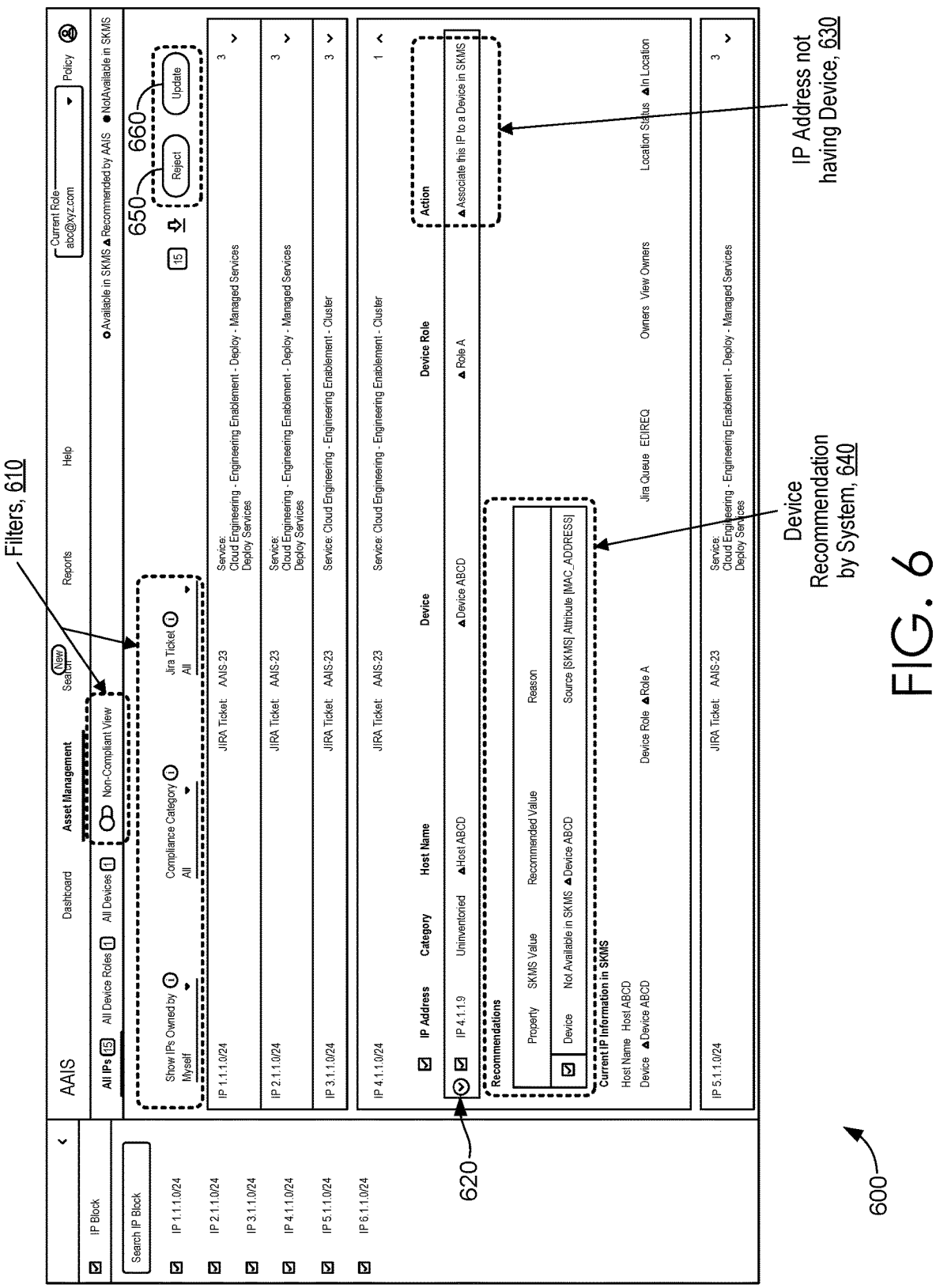
FIG. 6 is an illustration of a user interface of an AAIS in accordance with some embodiments of the present invention.

Looking now to FIG. 6, FIG. 6 depicts an exemplary user interface 600 that can be accessed by a user device, such as computing device 130 or computing device 150, so that a user can act upon recommendations generated by an asset accuracy intelligence system (AAIS) as described in accordance with FIGS. 1-3. In accordance with some embodiments described herein, the AAIS generates for display, among other things, a list of determined compliant or non-compliant IT assets, filtered views of the IT assets, interactive analytics relating to asset compliance rates, reports including remediation actions for non-compliant assets, recommendation accuracy of the trained machine learning models, and interactive interfaces to facilitate the rejection or acceptance of recommended remediation (i.e., updates) to be performed on determined non-compliant IT asset records. The exemplary user interface 600 depicts, among other things, an asset management section having a detailed view of IT assets determined non-compliant by the AAIS. In the illustrated example, the user interface 600 includes one or more filters 610 that enable a user of the user interface 600 to filter out IT assets based on a variety of attributes, such as owner, compliance status (e.g., compliant or non-compliant), and ticket number or status, among other things. Also depicted in the user interface 600 is an IT asset record 620 identified as non-compliant, specifically one that appears to be missing device service information. In accordance with the presented example, IP address "4.1.1.9" is identified as an un-inventoried (i.e., non-compliant) IT asset record because the IT asset record does not have a device associated with it. In other words, a rule engine (e.g., rule engine 222) of the system described herein may have defined therein a rule that requires each detected IP address on the networked computing environment to have a complete IT asset record, including all necessary IT asset information. Here, it appears that while an IP address has been identified, the IT asset record associated with the IP address is missing device service information. Because the IT asset record 620 is determined non-compliant, an action 630 to remedy the issue is presented alongside the IT asset record 620. Here, the device service inference model was employed such that the action 630 suggests that the IP address "4.1.1.9" should be associated with a specific device. Below the non-compliant IT asset record 620 is a recommendation section 640 that presents a suggested remediation action to be performed. Specifically, the recommendation section 640 suggests that "Device ABCD" should be the device associated with IP address "4.1.1.9." As depicted, the suggested remediation action (i.e., the inferred data) can also be displayed within the IT asset record 620 with an indicator (e.g., exclamation point or other icon) to distinguish the inferred data from the actual IT asset record data. Also depicted in the user interface 600 is a set of interactive action buttons or graphical user interface ("GUI") elements that enables a user to reject 650 the recommended remediation action (i.e., to ignore the inferred data) or accept (update 660) the recommended remediation action (i.e., to update the IT asset record with the inferred data).

Figure 7:
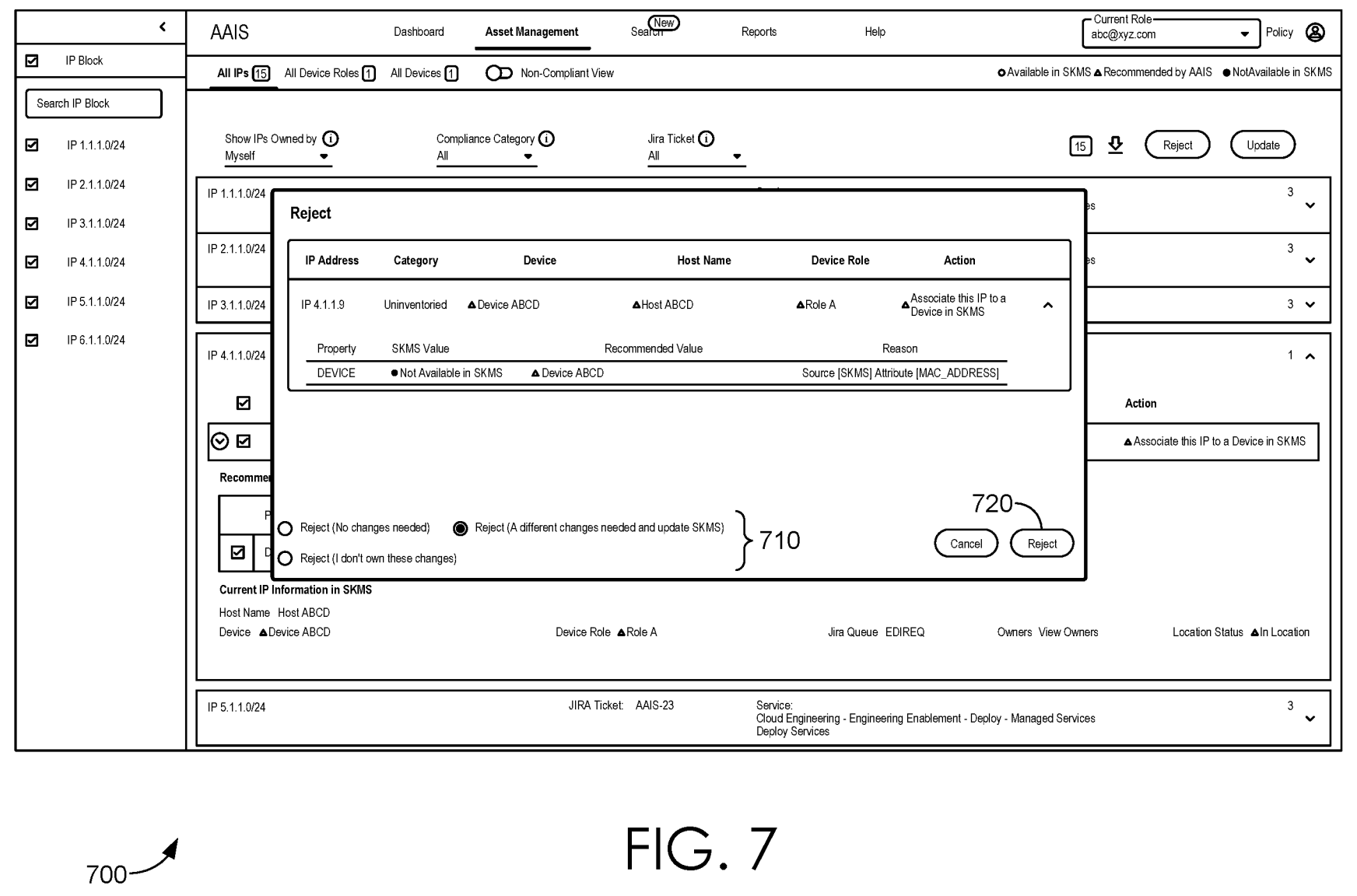

Looking now to FIG. 7, FIG. 7 depicts another exemplary user interface 700 that can be provided for display by the AAIS after a user interacts with the reject 650 GUI element of FIG. 6. That is, if a user decides to decline the recommended remediation action generated by AAIS and provides an input that corresponds to the reject 650 GUI element, then an updated user interface 700 can be generated and provided for display. In some embodiments, and as presented in exemplary user interface 700, a predefined set of rejection reasons 710 is presented for selection by the user. That is, the user is provided with a set of selectable rationales as to why the recommended action is being rejected. In this regard, one of the rejection reasons 710 can be selected and the user can confirm his or her selection by interacting with the reject confirmation button 720. In some aspects, the selected rejection reason can be stored and utilized as feedback to the AAIS system.

Figure 8:
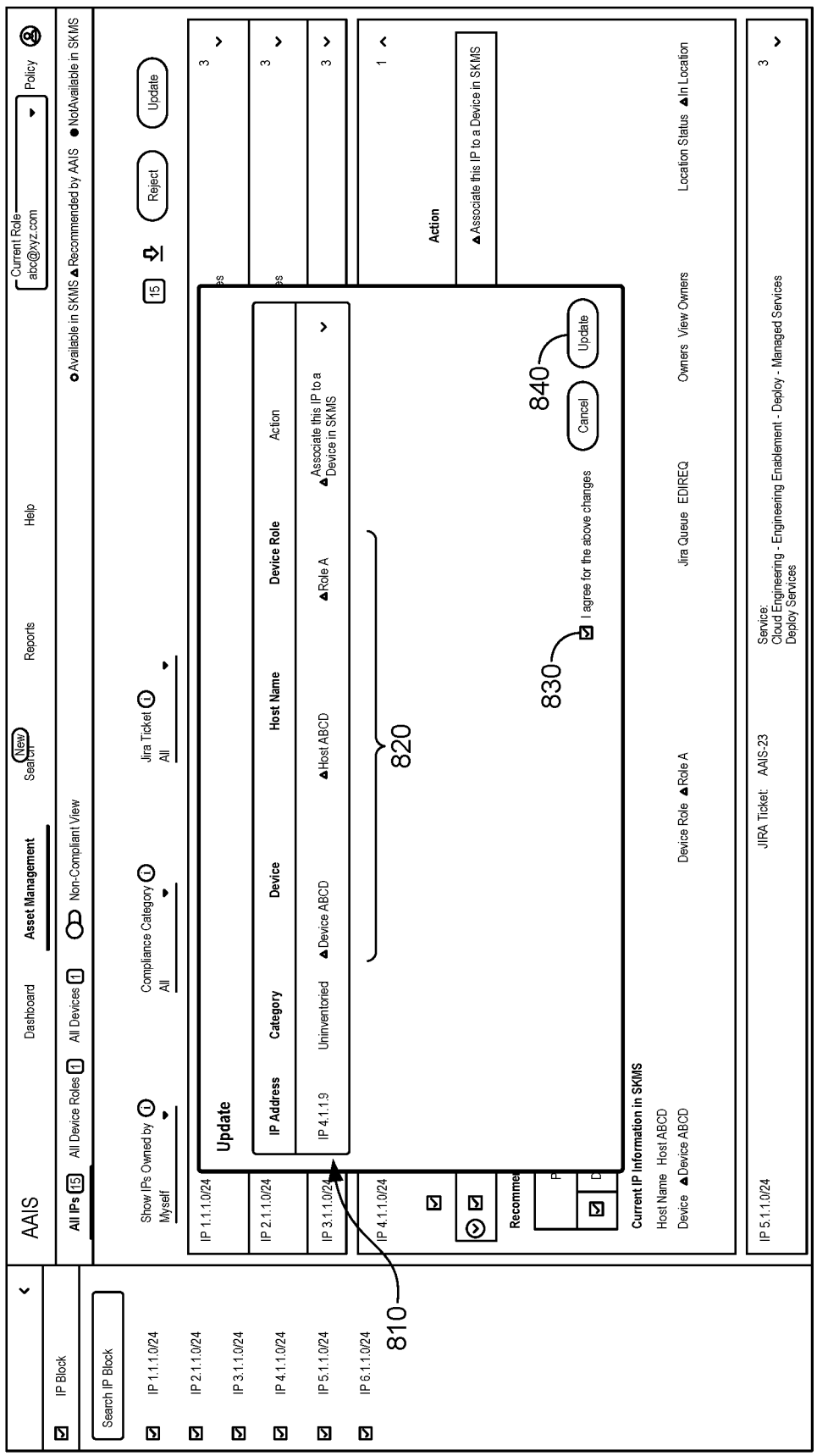
FIG. 8 is an illustration of yet another user interface of an AAIS in accordance with some embodiments of the present invention.

Looking now to FIG. 8, FIG. 8 depicts yet another exemplary user interface 800 provided for display by the AAIS after a user interacts with the update 660 GUI element of FIG. 6. That is, if a user decides to accept the recommended remediation action generated by AAIS and provides an input that corresponds to the update 660 GUI element, then an updated user interface 800 can be generated and provided for display. In some embodiments, and as presented in exemplary user interface 800, the IT asset record 810 associated with IP address "4.1.1.9" is presented with the inferred location service information 820 (e.g., "Device ABCD", "Host ABCD", "Role A") so that a user can confirm their desire to update the IT asset record with the inferred location service information. In some aspects, the user interface 800 can present an additional request to confirm the user's desire to update the record, such as the presented confirmation box 830. The user interface 800 can also present an update confirmation button 840, which can be enabled after confirmation box 830 is interacted with, so that the user can confirm his or her desire to store the inferred location service information into the IT asset record 810.

Figure 9:
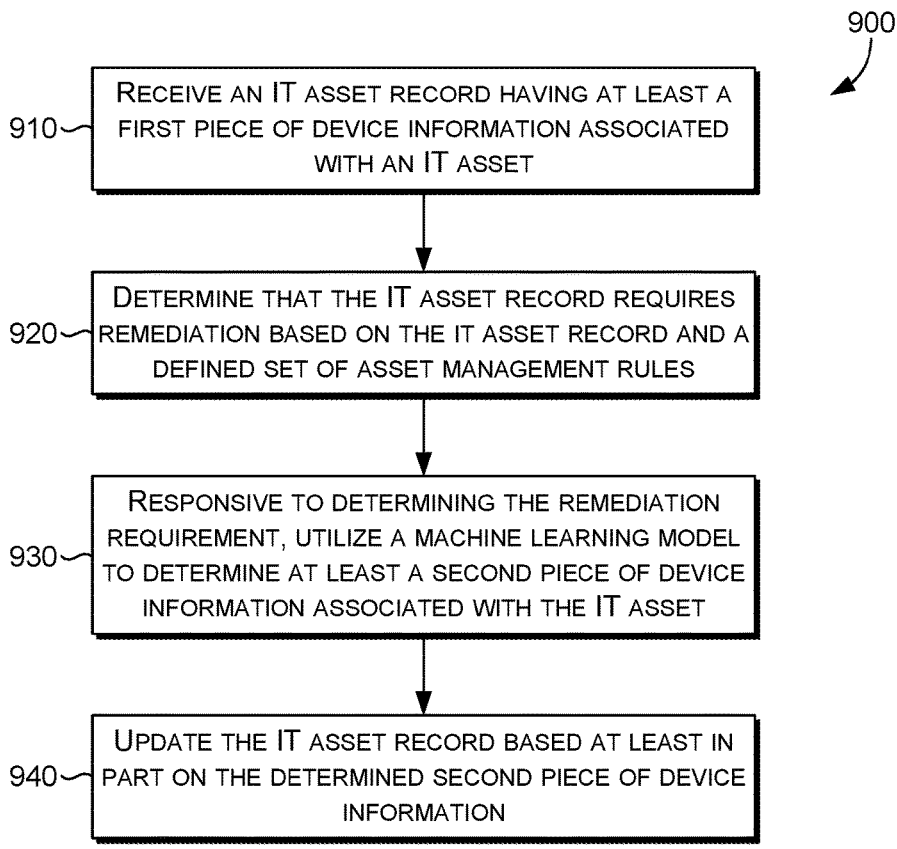
FIG. 9 is a flow diagram showing a method for remediating IT asset records in accordance with some embodiments of the present invention.

Turning now to FIG. 9, a flow diagram is provided that illustrates a method for remediating IT asset records. Looking at block 910, a computing system, such as an Asset Accuracy Intelligence System (AAIS) described in accordance with FIGS. 1-3, can receive an IT asset record associated with a particular IT asset. The IT asset record can include at least a first piece of IT asset information associated with the particular IT asset. In some aspects, the IT asset record can include a piece of device location information. As described herein, device location information of an IT asset can include one or more pieces of location-relevant information relating to the IT asset, such as IP address, device location name, or data center name, among other things. In some other aspects, the IT asset record can include a piece of device service information. The device service information of an IT asset, on the other hand, can include one or more pieces of service-relevant information relating to a primary purpose or usage of the IT asset, such as a unique device identifier, a host name, a device name, IP address, or a device service identifier, among other things.

At block 920, the AAIS can determine that the IT asset record requires remediation based on the associated IT asset record and a defined set of asset management rules. More specifically, the AAIS can have a set of asset management rules that correspond to an asset management policy of an entity (e.g., an owner or overseeing body of the networked computing environment). In embodiments, an IT asset record received by the AAIS may need to be analyzed in view of the set of asset management rules to determine whether the IT asset associated with the IT asset record is complaint or non-compliant in accordance with the defined set of asset management rules. In some cases, the set of asset management rules can require that all device location information of a particular IT asset be present in its associated IT asset record. That is, the set of asset management rules can define a requirement that all features, such as IP address, device location name, and data center name, be defined or stored in an IT asset record associated with a particular IT asset. As such, if any one particular piece of device location information is not defined in the IT asset record, the AAIS can flag the IT asset as non-compliant and thus requiring remediation.

Similarly, in some other cases, the set of asset management rules can require that all device service information of a particular IT asset be present in its associated IT asset record. That is, the set of asset management rules can define a requirement that all features, such as a unique device identifier, a host name, a device name, IP address, or a device service identifier, be defined or stored in an IT asset record associated with a particular IT asset. As such, if any one particular piece of device service information is not defined in the IT asset record, the AAIS can flag the IT asset as non-compliant and thus requiring remediation. In accordance with some embodiments, the AAIS generates a ticket associated with the IT asset, indicating that the IT asset and its associated IT asset record are non-compliant.

At block 930, the AAIS can utilize a machine learning model to determine at least a second piece of IT asset information associated with the particular IT asset. Because the IT asset was determined non-compliant, the second piece of IT asset information being sought can correspond to one or more pieces of device location or service information that is missing from the IT asset record. As is described in accordance with some embodiments herein, the AAIS can train, utilizing an inference component as described in accordance with inference component 300 of FIG. 3, one or more machine learning models utilizing IT asset records collected from a plurality of asset data sources, such as asset data sources 110 of FIG. 1. In some embodiments, a device location inference model can be trained and employed to determine or otherwise infer device location information associated with the IT asset. In some other embodiments, a device service inference model can be trained and employed to determine or otherwise infer device service information associated with the IT asset. The goal for either machine learning model is to determine or infer a value for one or more of these features, particularly for an IT asset where a value for a device location-type or device service-type feature is missing in an associated IT asset record. To this end, the AAIS can process, utilizing a trained machine learning model (i.e., device location inference model, device service inference model), the IT asset record including at least the first piece of IT asset information. In response, the trained machine learning model (i.e., device location inference model, device service inference model) can generate one or more inferences that correspond to at least a second piece of IT asset information associated with the particular asset. That is, if the first piece of IT asset information is a piece of device location information, the device location inference model can be employed to generate the second piece of IT asset information that can include another piece of device location information that is missing from the IP asset record. Similarly, if the first piece of IT asset information is a piece of device service information, the device service inference model can be employed to generate the second piece of IT asset information that can include another piece of device service information that is missing from the IT asset record. In accordance with some embodiments, the AAIS can modify the ticket associated with the IT asset, so that the ticket can reflect a recommended update (i.e., the second piece of IT asset information) to remediate the IT asset record.

At block 940, the AAIS can update the IT asset record based on the determined second piece of IT asset information. In other words, the piece of IT asset information determined missing from the IT asset record and causing the IT asset record to be non-compliant can be stored in the IT asset record. In some embodiments, the AAIS presents the IT asset record and the second piece of IT asset information to a user, so that the user can employ a user device, such as user device 130 of FIG. 1, to provide instructions to the AAIS to accept the inference and update the IT asset record. In some other embodiments, the AAIS autonomously accepts the inference and updates the IT asset record to store the second piece of IT asset information therein. In some other embodiments, the AAIS autonomously accepts the inference to update the IT asset record and closes the ticket associated with the IT asset, so that the closed ticket can reflect the fact that the recommended update was applied to the IT asset record.

Figure 10:
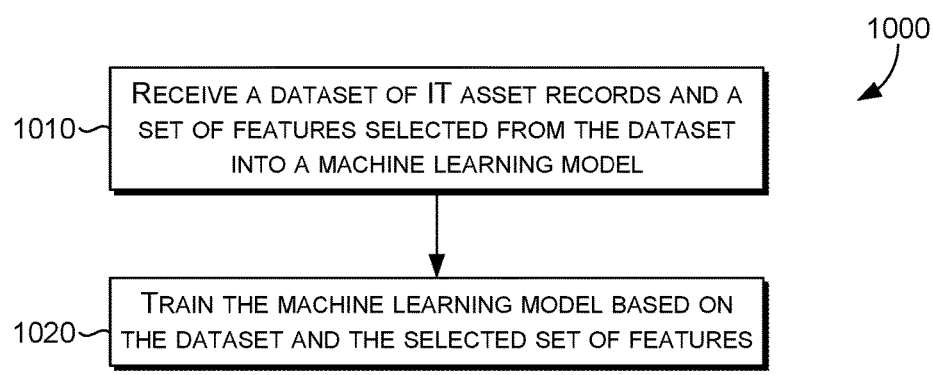
FIG. 10 is a flow diagram showing a method for training an AAIS in accordance with some embodiments of the present invention.

Turning now to FIG. 10, a flow diagram is provided that illustrates another method for remediating IT asset records. As was described in accordance with block 930 of FIG. 9, the AAIS can utilize a machine learning model to determine, based on at least a first piece of IT asset information associated with a particular IT asset, at least a second piece of IT asset information associated with the particular IT asset. Because the IT asset was determined non-compliant by the AAIS in block 920 of FIG. 9, the second piece of IT asset information being sought can correspond to one or more pieces of IT asset information (e.g., device location information or device service information) that is missing from the IT asset record. As is described in accordance with some embodiments herein, the AAIS trains, utilizing an inference component as described in accordance with inference component 300 of FIG. 3, a machine learning model utilizing IT asset records collected from a plurality of asset data sources, such as asset data sources 110 of FIG. 1.

The trained machine learning model can include a device location inference model employable to determine or otherwise infer device location information associated with the IT asset or device service inference model employable to determine or otherwise infer device service information associated with the IT asset. As described herein, the goal for the machine learning model is to determine or infer a value for one or more of features, particularly for an IT asset where a value for a device location or device service-type feature is missing in the associated IT asset record. To this end, the AAIS can process, utilizing a trained machine learning model, the IT asset record including at least the first piece of IT asset information. In response, the trained machine learning model can generate one or more inferences that correspond to at least a second piece of IT asset information associated with the particular asset. That is, if the first piece of IT asset information is a piece of device location information, the device location inference model can be employed to generate a second piece of IT asset information that includes another piece of device location information that is missing from the IP asset record. Likewise, if the first piece of IT asset information is a piece of device service information, the device service inference model can be employed to generate a second piece of IT asset information that includes another piece of device service information that is missing from the IT asset record.

In some embodiments, the AAIS, or more specifically an inference component like inference component 300 of FIG. 3, receives a plurality of IT asset records (e.g., training data) collected from a variety of asset data sources, such as asset data sources 110 of FIG. 1. As described in accordance with training data cleaning component 320 of FIG. 3, the AAIS can normalize or otherwise clean the plurality of IT asset records utilizing a variety of techniques, such as deleting data records that do not have attributes that could uniquely identify an asset, dropping data records that don't have a date, dropping data records whereby more than 50% of the asset attributes (i.e., columns) are empty, replacing null values or otherwise empty values with an "UNKNOWN" string for string-type values, or replacing null values or otherwise empty values with an average value of the feature for numerical-type values.

The AAIS can further alter or otherwise modify the cleaned plurality of IT asset records to optimize either feature selection or model training, as described in accordance with training data optimizing component 340 of FIG. 3. By way of example, the AAIS can tokenize one or more features in the cleaned plurality of IT asset records, particularly if the values for such features are categorical (i.e., non-numerical). In some aspects, categorical values such as IP addresses, subnets, domain names, and the like, can be tokenized so that portions thereof (e.g., octets of an IP address) can be separated into independent features. Moreover, in some other aspects, categorical values can be label encoded, such that for any particular feature, the AAIS can determine a total number of categories (n classes) and assign a unique numerical value (between 0 and n−1) to each of the determined categories.

After the cleaned plurality of IT asset records is optimized, the AAIS can derive insights from the records to select optimal features for model training. As described in accordance with feature selecting component 330 of FIG. 3, in some embodiments, the AAIS analyzes the distribution of values for any feature of the IT asset records to determine whether the data for the feature is equally distributed or is biased to any particular value. In cases where the data is determined biased to a particular value for a feature, the feature can be ignored and not selected for model training. On the other hand, where data is determined sufficiently distributed (i.e., having at least a threshold number of different values or a threshold percentage of different values), the AAIS can select the feature for purposes of model training. In some other embodiments, the AAIS analyzes correlations between various feature values to determine whether any one feature is dependent on another feature. More specifically, the AAIS can determine whether two features have a positive or negative correlation there between, and select the features if the correlations meet a threshold correlation value, as described in accordance with feature selecting component 330.

Looking at block 1010 of FIG. 10, the AAIS can receive the cleaned plurality of IP asset records and the set of features selected from the cleaned plurality of IP asset records. In some cases, the set of features is selected based on correlational relationships identified between features of the IP asset records. In other cases, the set of features is selected based on diversity of values in the various features of the IP asset records. In yet some other cases, the set of features is selected based on a combination of identified correlational relationships and diversity.

At block 1020, the AAIS can train a decision tree-based machine learning model, as similarly described in accordance with model training component 350 of FIG. 3, training the model with the cleaned plurality of IP asset records and the selected set of features. The trained machine learning model can be employed to determine, based at least in part on a first piece of IT asset information in an IT asset record associated with a particular IT asset, at least a second piece of IT asset information for the IT asset record associated with the particular IT asset. As similarly described in relation to blocks 910-940 of FIG. 9, the trained machine learning model can facilitate the autonomous remediation of IT asset records in accordance with the various embodiments described herein.

Figure 11:
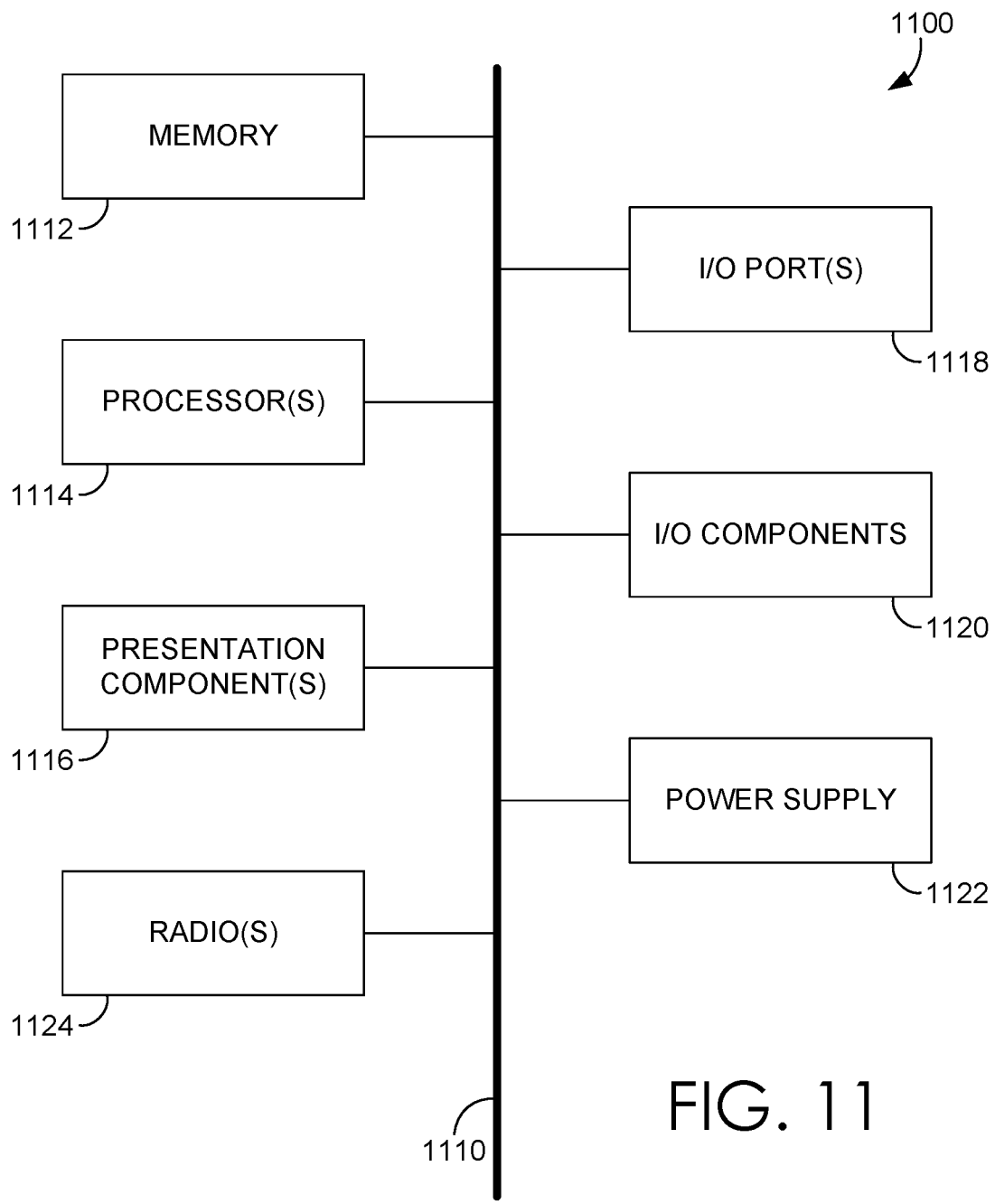
FIG. 11 is a block diagram of an exemplary computing environment suitable for use in implementing some embodiments of the present invention.

Having described embodiments of the present disclosure, an exemplary operating environment in which embodiments of the present disclosure may be implemented is described below in order to provide a general context for various aspects of the present disclosure. Referring initially to FIG. 11 in particular, an exemplary operating environment for implementing embodiments of the present disclosure is shown and designated generally as computing device 1100. Computing device 1100 is but one example of a suitable computing environment and is not intended to suggest any limitation as to the scope of use or functionality of the disclosed embodiments. Neither should the computing device 1100 be interpreted as having any dependency or requirement relating to any one or combination of components illustrated.

The embodiments described herein may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The embodiments described herein may be practiced in a variety of system configurations, including hand-held devices, consumer electronics, general-purpose computers, more specialty computing devices, etc. The embodiments described herein may also be practiced in distributed computing environments where tasks are performed by remote-processing devices that are linked through a communications network.

With reference to FIG. 11, computing device 1100 includes a bus 1110 that directly or indirectly couples the following devices: memory 1112, one or more processors 1114, one or more presentation components 1116, input/output (I/O) ports 1118, input/output components 1120, and an illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 11 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer-storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. Also contemplated are Internet of Things ("IOT") devices or components, any of which can include one or more sensors or actuators, among other things. The I/O components 1120 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be equipped with depth cameras, such as stereoscopic camera systems, infrared camera systems, RGB camera systems, touchscreen technology, and combinations of these, for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

As can be understood, embodiments of the present disclosure provide for, among other things, autonomously remediating IT asset records in accordance with a defined asset management policy. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that embodiments described herein are well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium storing computer-executable instructions that, when executed by a processing device, cause the processing device to:
   receive an information technology (IT) asset record associated with a particular IT asset of a plurality of IT assets hosted in a networked computing environment, the IT asset record having at least a first piece of IT asset information associated with the particular IT asset;
   determine that a defined set of asset management rules requires at least a second piece of IT asset information in the IT asset record;
   determine that the IT asset record requires remediation by adding at least the second piece of IT asset information so that the IT asset record is in compliance with the defined set of asset management rules;
   in response to the determination that the IT asset record requires remediation, autonomously generate a ticket associated with the particular IT asset;
   determine, utilizing a machine learning model, at least the second piece of IT asset information associated with the particular IT asset based at least in part on the first piece of IT asset information, wherein at least the determined second piece of IT asset information is presented as a suggested remediation action;
   update the IT asset record to include the determined second piece of IT asset information based on an acceptance of the suggested remediation action; and
   automatically close the ticket in response to the IT asset record being updated to include the second piece of IT asset information.

2. The computer storage medium of claim 1, wherein the IT asset record is determined to require remediation because the defined set of asset management rules requires that each of the first and second pieces of IT asset information are included in the IT asset record and the second piece of IT asset information is missing from the IT asset record.

3. The computer storage medium of claim 1, wherein each of the first and second pieces of IT asset information corresponds to one of a plurality of location attributes of the particular IT asset, the plurality of location attributes including an IP address of the particular IT asset, a location name associated with the particular IT asset, or a data center name associated with the particular IT asset.

4. The computer storage medium of claim 1, wherein each of the first and second pieces of IT asset information corresponds to one of a plurality of service attributes of the particular asset, the plurality of service attributes including a unique device identifier of the particular IT asset, a hostname of the particular IT asset, a device name of the particular IT asset, an IP address of the particular IT asset, or a device service identifier associated with the particular IT asset.

5. The computer storage medium of claim 1, wherein the instructions further cause the processing device to:
   receive an input that corresponds to a first graphical user interface (GUI) element to accept the determined second piece of IT asset information, wherein the IT asset record is updated to include the determined second piece of IT asset information based on the received input.

6. The computer storage medium of claim 1, wherein the machine learning model is trained utilizing a dataset of IT asset records and a set of features selected from the dataset based on a determined non-biased distribution of values for each feature of the dataset and determined correlational strengths between feature pairs of the dataset.

7. A computer-implemented method for autonomously remediating information technology (IT) asset records, the method comprising:
   receiving, into a machine learning model, a dataset of IT asset records and a set of features selected from the dataset based on a determined non-biased distribution of values for each feature of the dataset and on determined correlational relationships there between; and
   training the machine learning model based on the dataset and the selected set of features to generate a trained decision-tree machine learning model that is employable to determine that an IT asset record associated with a particular IT asset and having a first piece of IT asset information is not in compliance with a defined set of asset management rules, and further determine at least a second piece of IT asset information for autonomous updating of the IT asset record to place the IT asset record into compliance with the defined set of asset management rules.

8. The method of claim 7, further comprising:
   obtaining a plurality of IT asset records, each IT asset record of the plurality of IT asset records having a plurality of features and a plurality of corresponding values;
   determining the correlational relationships between each feature of the plurality of features; and
   selecting the set of features based on the determined correlational relationships of each feature of the plurality of features.

9. The method of claim 8, wherein the dataset is a randomly-selected portion of the plurality of IT asset records, and the set of features is selected based further on a determined distribution of values for each feature in the set of features.

10. The method of claim 8, further comprising:
    determining that a portion of the plurality of corresponding values includes non-numerical values; and
    tokenizing the portion of the plurality of corresponding values into semantic units.

11. The method of claim 10, further comprising:
    label encoding the tokenized portion of the plurality of corresponding values to give the non-numerical values unique numerical values.

12. A system comprising:

a processing device, and a memory component coupled to the processing device, the processing device to perform operations comprising:

receiving an information technology (IT) asset record associated with a particular IT asset of a plurality of IT assets hosted in a computing environment, the IT asset record having at least a first piece of IT asset information associated with the particular IT asset;

determining that a set of asset management rules requires at least a second piece of IT asset information in the IT asset record;

determining that the IT asset record needs remediation by adding at least the second piece of IT asset information so that the IT asset record is in compliance with the set of asset management rules;

in response to the determination that the IT asset record requires remediation, autonomously generate a ticket associated with the particular IT asset;

determining, utilizing a machine learning model, at least the second piece of IT asset information associated with the particular IT asset based at least in part on the first piece of IT asset information, wherein at least the determined second piece of IT asset information is presented as a suggested remediation action;

updating the IT asset record to include the determined second piece of IT asset information based on an acceptance of the suggested remediation action; and automatically close the ticket in response to the IT asset record being updated to include the second piece of IT asset information.

13. The system of claim 12, wherein the machine learning model is trained utilizing a dataset of IT asset records and a set of features selected from a plurality of features in the dataset based on a determined non-biased distribution of values for each feature of the plurality of features.

14. The system of claim 13, wherein the set of features is selected from the plurality of features based further on determined correlational strengths between feature pairs of the dataset.

15. The system of claim 13, wherein at least a portion of the plurality of features is tokenized into semantic units and then label encoded to assign unique numerical values thereto.

\* \* \* \* \*